March 27, 1956   H. S. DETWILER   2,739,682
OVERRUNNING CLUTCH
Filed June 11, 1951

INVENTOR
HARRY S. DETWILER
BY *M. W. Gould*
ATTORNEY

United States Patent Office 2,739,682
Patented Mar. 27, 1956

2,739,682

OVERRUNNING CLUTCH

Harry S. Detwiler, Lancaster, Pa., assignor to Hamilton Watch Company, Lancaster, Pa.

Application June 11, 1951, Serial No. 230,999

2 Claims. (Cl. 192—46)

This invention relates to a mechanism for the transference of oscillating motion to rotary motion in one direction.

The object of the present invention is to provide a pair of gears so connected in a train of gears that they will transfer rotary motion from one gear to another when turning in one direction, but in a reverse direction will receive the motion from the driving gear but will not transfer it to the driven gear.

A further object of the present invention is to provide a pair of pawls adapted when the gear is turned in one direction to engage an abutment formed on the gear and transmit motion to the second gear carrying the pawls; whereas motion in the reverse direction of the first mentioned gear permits the pawls to slip by the abutment and no motion is transferred.

It is a further object of the present invention to provide an overrunning clutch or mechanism for transferring the motion of one gear to another gear in which the operation, either of the transference of motion or in the absorption of the motion, there is no noise such as the usual clicking of a pawl against the gear teeth.

It is a further object of the invention that there should be no wear surfaces such as the pawl riding on the tooth gears or where gears have interlocking teeth which ride over one another in one direction, but provides a guided pawl which pivots so that there is no sliding contact between the abutting edges when the gear is turning in the free running direction.

The invention is shown in the accompanying drawing in which.

Figure 1:
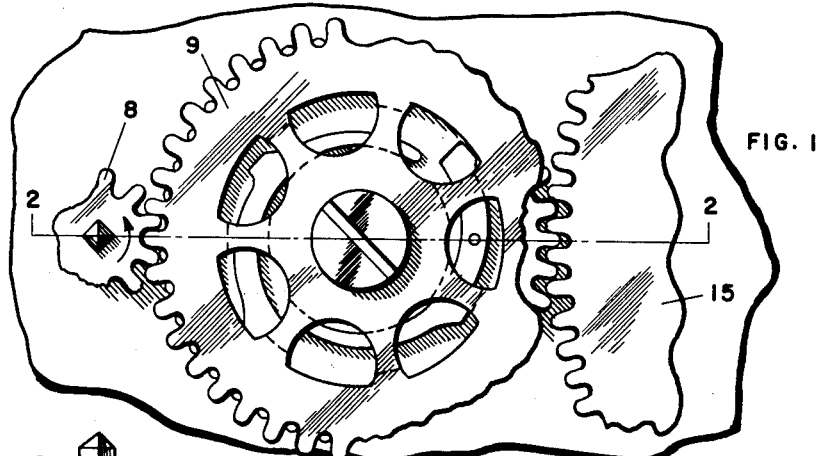
Figure 1 is a top plan view showing the overrunning clutch between a driving pinion and a driven gear.
Figure 2:
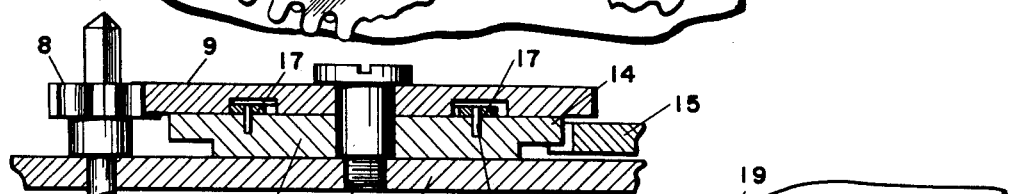
Figure 2 is a cross section on line 2—2 of Figure 1.

Referring to the drawing a driving pinion 8 is in mesh with a top gear 9 of the overrunning clutch. Gear 9 is mounted and pivotally secured to a plate 10 by a pivot screw 11. Also pivotally mounted on the pin 11 is a second or bottom gear 13 carried between the top gear 9 and the plate 10. The gear 13 is provided with teeth 14 which mesh with a driven gear 15. Gear 13 also carries pins 16 which pivotally support a pair of pawls 17. The pawls are restricted in their pivotal movement by a milled annular groove 18 in the undersurface of the top gear 9, the outer edges of said groove being formed with abutments 19 while the inner edges of the groove are formed with cammed surfaces 20.

Figure 3:
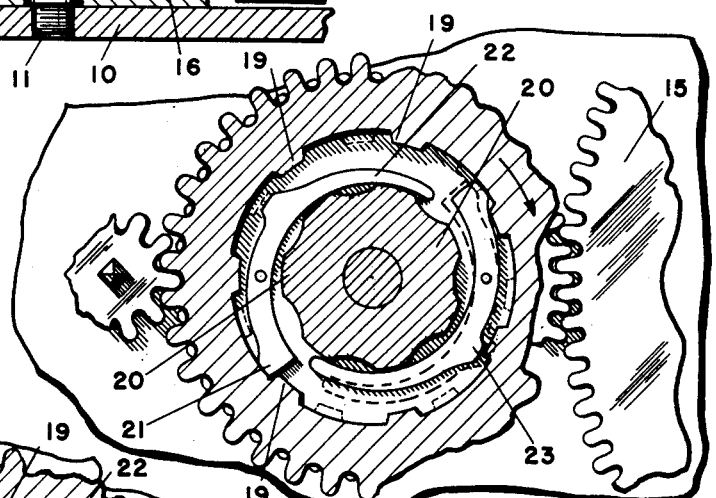
Figure 3 is a top cross sectional view with the section taken centrally through the top gear on a plane parallel to the face of the gear and showing one pawl in engaging position.
Figure 4:
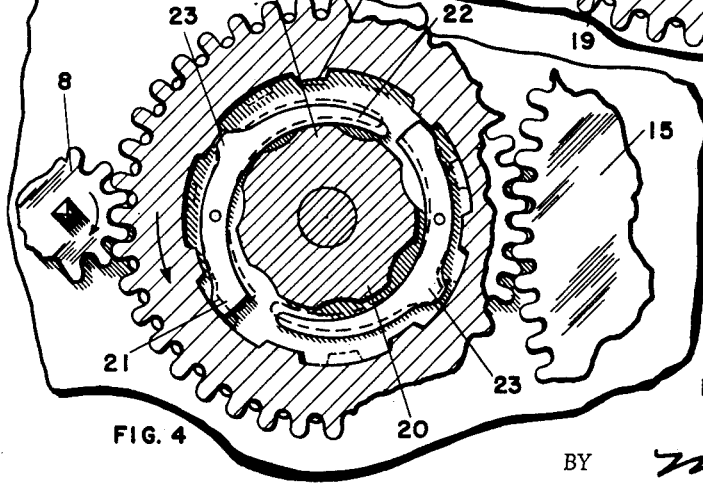
Figure 4 is a view similar to Figure 3 with the pawl in free running position.

The pawl 17 is formed at one end with an abutting foot 21 and at the other end with a narrowed tongue 22 while the middle outer portion of the pawl is provided with a cammed surface 23, the function of which is to swing the pawl about its pivot to bring the abutting foot 21 into the path of movement of the abutment 19, when the gear 9 is moving in a counterclockwise direction. The device is intended as an overrunning clutch for winding a watch in which the movement of the winding stem is oscillatory, whereas the motion delivered to the mainspring is in one direction. The pinion 8 which is connected to the winding stem is turned in the direction of the arrow shown in Figure 1 to drive the gear 9 in the direction of the arrow shown in Figure 3 which brings the abutment 19 into engagement with the butt end 21 of the pawl and drives the lower gear 13 through the pins 16, which motion is transferred through the gear teeth 14 to the gear 15. Movement of the pinion 8 in a direction opposite to the arrow shown in Figure 1, however, moves the gear 9 in a direction of the arrow in Figure 4 and permits the pawl to pivot slightly on the pin 16 and allows the gear 9 to rotate without engaging the pawl. The movement of the gear 9 in the direction of the arrow shown in Figure 4 produces no motion in the bottom gear 13 and of consequence no motion to the gear 15.

What is claimed is:

1. In a gear train having a driving gear and a driven gear mounted on the same axle, a pair of pawls independent of each other and pivotally mounted on said driven gear, said pawls being substantially concentric with said gears, said driving gear being formed in the face adjacent the driven gear with an annular groove for completely housing said pawls, projections carried on the outer wall of said groove independently moving said pawls into operative and inoperative position, depending upon the direction of rotation of the driving gear, whereby the motion of the driving gear is transferred to the driven gear only when the driving gear is rotating in a clockwise direction.

2. In a gear train having a driving gear and a driven gear mounted on the same axle, a pair of arcuate shaped pawls independent of each other and pivotally mounted on said driven gear at equal distances from said axle, said pawls being formed at one end with an abutting shoulder and at the other being tapered to a rounded point, a projecting cam surface formed centrally of the pawls along the outermost edge, said driving gear being formed with an annular groove on the face adjacent the driven gear, said groove completely housing said pawls, projections carried on the outer wall of said groove for independently engaging the abutting shoulder and the cam projection of each of said pawls to move said pawls into operative or inoperative position depending upon the direction of rotation of the driving gear, whereby the driven gear will turn with the driving gear when moving in a clockwise direction.

References Cited in the file of this patent

UNITED STATES PATENTS

| 1,069,234 | Dahl et al. | Aug. 5, 1913 |
| 2,330,677 | Canfield | Sept. 28, 1943 |

FOREIGN PATENTS

| 30 | Italy | of 1885 |
| 269,848 | Switzerland | Nov. 1, 1950 |
| 565,056 | France | Apr. 12, 1923 |
| 903,072 | France | Mar. 28, 1944 |

OTHER REFERENCES

Scientific American Supp. No. 1536, June 10, 1905, pages 24, 616 and 24, 617.